Patented Oct. 12, 1948

2,451,174

UNITED STATES PATENT OFFICE 2,451,174

VULCANIZATION OF VINYL RESIN

Louis F. Reuter, Akron, Ohio, assignor to The B. F. Goodrich Company, New York, N. Y., a corporation of New York No Drawing. Application October 14, 1943, Serial No. 506,271

3 Claims. (Cl. 260—88)

This invention relates to the vulcanization of vinyl resins, and pertains more specifically to the reduction of the thermoplasticity of plasticized compositions containing polymers made from the halogenated ethylenes.

As is well known, various polymers of the halogenated ethylenes may be plasticized with certain plasticizers to give rubbery plastic products possessing properties which render them valuable as substitutes for natural rubber. These plastic products also have certain properties not possessed by natural rubber, which render them superior to rubber for many uses. Among the polymers which have been thus employed are those made from vinyl chloride, vinylidene chloride, vinyl bromide, vinylidene bromide, and mixtures of these monomers with one another as well as with other copolymerizable monomers such as vinyl acetate, vinyl propionate, vinyl butyrate, methyl acrylate, methyl methacrylate, methyl ethacrylate, and other similar materials. One of the outstanding properties of these plasticized polymeric compositions is that they are permanently thermoplastic, that is, that they may be repeatedly softened by heating to a temperature well above room temperature. Although this property is in many respects advantageous, it is undesirable when the materials are exposed to high-temperature service.

I have now discovered that the thermoplasticity of these polymeric compositions may be greatly reduced or completely eliminated by heating the composition with an aliphatic or an alicyclic amine. Because this reduction of thermoplasticity is analogous with the change which occurs in rubber when it is vulcanized, I have termed my process vulcanization. However, by the use of this term, I do not intend to restrict myself to any particular theory as to the mechanism of the process. The vulcanizing agents which I have found to be effective include a wide variety of amines falling within the broad class disclosed above. However, I have found that three particular types of amines within this broad range are to be preferred. They are (1) aliphatic polyamines, particularly those which, except for the nitrogen of the amino groups contain only carbon and hydrogen; (2) the cinchona alkaloids; and (3) the polymers of 2,2,4-trimethyl dihydroquinoline.

Among the amines in the first group, which I have found to be particularly effective are ethylene diamine, diethylene triamine, triethylene tetramine, tetraethylene pentamine, propylene diamine, trimethylene diamine, 1,2-diaminobutane, 1,3-diaminobutane, tetramethylene diamine, 2,3-diaminobutane, pentamethylene diamine, 2,4-diaminopentane, hexamethylene diamine, 1,2,3-triaminopropane, the hexahydrophenylene diamines, and other similar compounds.

Among those of the second type are quinine, quinicine, cinchonine, cinchonicine, quinoidine, and the various other cinchona alkaloids.

The amines of the third type, polymers of 2,2,4-trimethyl dihydroquinoline, may be readily prepared by heating the monomer at a temperature of about 110 to 150° C. in the presence of aqueous hydrochloric acid. The polymeric material is sold on the market under the trade name of "Age Rite Resin D." Although the amines of the second and third types include aromatic groups in the molecules, they are functionally aliphatic or alicyclic amines, and are therefore included within the broad scope of this invention.

The polymers with which my new vulcanizing agents are effective consist of those made by the polymerization of monomeric materials consisting predominantly of a halogenated ethylene, in which from one to two halogen atoms are attached to one only of the carbon atoms. Although as little as 0.5 per cent of my new vulcanizing agent, based upon the weight of the polymer, may be effective under the proper conditions, I have found that the best results are obtained by using from about two to about ten per cent or more. The amount and type of plasticizer employed in the composition is not critical, although, of course, the softness and resiliency of the stock depend to a large extent upon the particular plasticizer employed. In general, useful compositions may be secured by using from about 20 to about 150 parts of plasticizer for each 100 parts of polymer. Any of the usual plasticizers may be employed, such as tricresyl phosphate, dibutyl phthalate, dicapryl phthalate, ditetrahydrofurfuryl sebacate, butyl phthalyl butyl glycollate, undecyl tetrahydronaphthyl ketone, cyclohexyl o-benzoylbenzoate, or the like.

The vulcanizing agent may be added together with the plasticizer to the polymer, either on a hot roll mill or in an internal mixer, or a mixture of vulcanizing agent and plasticizer may be added to an emulsion or solution of the polymer. If desired, the plasticizer may be first incorporated in the polymer, and the vulcanizing agent added to the plasticized composition. In order to obtain vulcanization, it is necessary to heat the composition containing the vulcanizing agent to an elevated temperature for a substantial period of time. Although the temperature and time of vulcanization vary with the amount and type of plasticizer employed, as well as with the type of polymer, best results are generally secured by heating the composition to a temperature of at least 300° F., preferably about 320° to about 350° F. At these temperatures the time required for vulcanization varies from about 10 to about 100 minutes, depending upon the particular ingredients of the composition.

It has been found that the ease of vulcanization of the polymer is directly proportional to the halogen content of the polymer. For example, a polymer of vinylidene chloride is more readily vulcanized than a copolymer of vinyl chloride with vinyl acetate. However, any polymer made by the polymerization of a mixture of monomers containing a predominant amount of either a vinyl halide or a vinylidene halide may be vulcanized with my new agent.

The following examples will serve further to illustrate my invention.

*Example I*

A plasticized polymer composition was prepared by mixing 100 parts by weight of high molecular weight polyvinyl chloride with 70 parts of butyl phthalyl butyl glycollate on a hot roll mill. There was added to this composition on the mill, as vulcanizing agent, three parts of tetraethylene pentamine. After thoroughly mixing, the composition was vulcanized in a press for 30 minutes at 330° F. A similar composition containing no vulcanizing agent was heated in a press under the same conditions. When cooled, the two products were both resilient, rubbery materials having a high tensile strength. When heated, however, the product containing no vulcanizing agent became progressively softer and more plastic, whereas the vulcanized product retained its resilience and rubbery qualities to a remarkable degree, even at temperatures as high as 150° C. The unvulcanized product could readily be sheeted out on a hot roll mill, whereas the vulcanized product could not be. Similar results may be obtained using a composition containing five parts of tetraethylene pentamine, together with five parts of magnesium oxide.

*Example II*

To 100 parts by weight of a polymer prepared by the copolymerization of 97½ parts of vinyl chloride with 2½ parts of vinylidene chloride, there were added 80 parts of dicapryl phthalate and 10 parts of magnesium oxide on a hot roll mill. To this composition there was added as vulcanizing agent five parts of quinoidine, and the composition was heated in a press for 20 minutes at 340° F. The resultant composition was very similar in properties to the vulcanized composition of Example I, exhibiting the same remarkable lack of thermoplasticity, and the same low permanent set. Similar results were obtained using a high molecular weight polymer of vinyl chloride.

*Example III*

A plasticized composition containing 100 parts by weight of high molecular weight polyvinyl chloride, 75 parts of butyl phthalyl butyl glycollate, and 20 parts of magnesium oxide was prepared as in Example II. To this composition there were added 10 parts of polymerized 2,2,4-trimethyl dihydroquinoline, and the resultant composition was vulcanized 20 minutes in a press at 330° F. The vulcanized composition was similar in properties to the vulcanized composition of Examples I and II. It exhibited a permanent set, measured at 150° C., only about one-third as great as the permanent set of a similar unvulcanized composition.

Any of the usual pigments, fillers, reinforcing agents, stabilizers or other materials commonly used in vinyl resin compositions may be employed in my new vulcanizable composition without deleterious effects.

These new vulcanized compositions are useful for all the purposes to which the plasticized vinyl resins heretofore known have been put at ordinary temperatures. In addition, they exhibit greatly superior properties at elevated temperatures, and are particularly valuable for their low permanent set.

Although I have herein described specific embodiments of my invention, I do not intend to restrict myself solely thereto, but to include all of the modifications embraced within the spirit and scope of the appended claims.

I claim:

1. The method of vulcanizing a plasticized polymer composition having as a base a polymer prepared by the polymerization of a monomeric material consisting predominantly of a halogenated ethylene containing from one to two halogen atoms on one only of the carbon atoms, which comprises incorporating in said plasticized polymer composition from 2.0 to 10%, by weight of the polymer, of polymerized 2,2,4-trimethyl dihydroquinoline, and heating said composition at a temperature from 300° to 350° F. for 10 to 100 minutes.

2. The method of vulcanizing a plasticized polymer composition having as a base polyvinyl chloride, which comprises incorporating in said plasticized polymer composition from 2.0 to 10%, by weight of the polymer, of polymerized 2,2,4-trimethyl dihydroquinoline, and heating said composition at a temperature from 300° to 350° F. for 10 to 100 minutes.

3. A vulcanized composition prepared by the method of claim 1.

LOUIS F. REUTER.

REFERENCES CITED

The following references are of record in the file of this patent:

UNITED STATES PATENTS

| Number | Name | Date |
|---|---|---|
| 2,013,941 | Young et al. | Sept. 10, 1935 |
| 2,103,581 | Gray | Dec. 28, 1937 |
| 2,117,591 | Alexander | May 17, 1938 |
| 2,122,707 | Balthis | July 5, 1938 |
| 2,148,831 | Raynolds | Feb. 28, 1939 |
| 2,169,717 | Young | Aug. 15, 1939 |
| 2,190,776 | Ellingboe | Feb. 20, 1940 |
| 2,208,216 | Johnson et al. | July 16, 1940 |
| 2,224,944 | Young | Dec. 17, 1940 |
| 2,274,616 | Raynolds | Feb. 24, 1942 |
| 2,304,637 | Hardy | Dec. 8, 1942 |
| 2,316,197 | Tucker | Apr. 13, 1943 |
| 2,365,400 | Fikentscher | Dec. 19, 1944 |
| 2,395,507 | Sauser | Feb. 26, 1946 |
| 2,405,008 | Berry et al. | July 30, 1946 |